(12) United States Patent
Patenaude et al.

(10) Patent No.: US 12,437,649 B2
(45) Date of Patent: Oct. 7, 2025

(54) MANAGEMENT OF SET OF VEHICLES FOR ASSISTANCE AT AN EVENT

(71) Applicant: GM GLOBAL TECHNOLOGY OPERATIONS LLC, Detroit, MI (US)

(72) Inventors: Russell A. Patenaude, Macomb Township, MI (US); Matthew E. Gilbert-Eyres, Rochester Hills, MI (US); Eric T. Hosey, Rochester Hills, MI (US); Adam L. Wright, Livonia, MI (US); Matthew Neely, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 261 days.

(21) Appl. No.: 18/333,002

(22) Filed: Jun. 12, 2023

(65) Prior Publication Data

US 2024/0412640 A1   Dec. 12, 2024

(51) Int. Cl.
G08G 1/00 (2006.01)
G08G 1/0967 (2006.01)

(52) U.S. Cl.
CPC ....... G08G 1/202 (2013.01); G08G 1/096725 (2013.01); G08G 1/096766 (2013.01)

(58) Field of Classification Search
CPC ............. G08G 1/202; G08G 1/096725; G08G 1/096766; G08G 1/09
See application file for complete search history.

(56) References Cited

U.S. PATENT DOCUMENTS

| | | | | |
|---|---|---|---|---|
| 11,556,134 | B1* | 1/2023 | Durairaj | G05D 1/0297 |
| 2012/0173045 | A1* | 7/2012 | Conroy | G05D 1/0038 |
| | | | | 701/1 |
| 2016/0236638 | A1* | 8/2016 | Lavie | G06V 20/00 |
| 2016/0357183 | A1* | 12/2016 | Shaw | G06Q 30/0645 |
| 2018/0018869 | A1* | 1/2018 | Ahmad | G08G 1/054 |
| 2018/0040217 | A1* | 2/2018 | Feldman | H04W 4/02 |
| 2020/0233419 | A1* | 7/2020 | McDuff | G08G 1/205 |

FOREIGN PATENT DOCUMENTS

CN      208395720 U  *  1/2019

OTHER PUBLICATIONS

Machine translation of CN-208395720-U (Year: 2019).*

* cited by examiner

*Primary Examiner* — Navid Z. Mehdizadeh
*Assistant Examiner* — Caitlin R Mccleary
(74) *Attorney, Agent, or Firm* — Quinn IP Law

(57) ABSTRACT

A system for managing a vehicle set includes a controller having a processor and tangible, non-transitory memory on which instructions are recorded. The vehicle set includes a plurality of autonomous vehicles each having a respective telematics unit adapted to communicate with the controller. The controller is adapted to receive notification of an event in real-time and identify at least one center of the event. The controller is adapted to determine a respective status of the vehicle set in real-time, including a respective availability and a respective proximity to the event. The controller is adapted to dispatch selected ones of the vehicle set to the event based in part on the respective status and assign event duties to the selected ones of the vehicle set. The event duties including forming a boundary around the at least one center of the event by being physically stationed around the at least one center.

15 Claims, 3 Drawing Sheets

MANAGEMENT OF SET OF VEHICLES FOR ASSISTANCE AT AN EVENT

INTRODUCTION

The present disclosure relates generally to the management of vehicles. More specifically, the disclosure relates to a system and method of managing a set of vehicles that assist at an event or place. There are many situations or events occurring in the world that require a rapid deployment of resources. These events may include downed power lines, fallen trees, traffic issue, chemical spills and other situations. Many of these situations may require roadblocks, detours, and impromptu directions to be given to vehicles and pedestrians. In some cases, the required level of resources may not be readily available, resulting in a delayed response and/or an under-supported response.

SUMMARY

Disclosed herein is a system for managing a vehicle set, the system including a controller having a processor and tangible, non-transitory memory on which instructions are recorded. The vehicle set includes a plurality of autonomous vehicles each having a respective telematics unit adapted to communicate with the controller. The controller is adapted to receive notification of an event and identify at least one center of the event. The controller is adapted to determine a respective status of the vehicle set in real-time, including a respective availability and a respective proximity to the event. Furthermore, the controller is adapted to dispatch selected ones of the vehicle set to the event based in part on the respective status and assign event duties to the selected ones of the vehicle set. The event duties including forming a boundary around the at least one center of the event by being physically stationed around the at least one center, i.e., the selected ones of the vehicle set being parked around the at least one center.

The event duties may include advising surrounding entities to stay outside the boundary, the surrounding entities including vehicles and/or pedestrians. In some embodiments, the event duties include monitoring an interior side of the boundary and an exterior side of the boundary and reporting if surrounding entities cross into the interior side of the boundary. The surrounding entities include vehicles, passersby and/or pedestrians. The event duties may include redirecting traffic around the at least one center of the event. The event duties may include providing an audible signal of a detour route around the at least one center of the event.

In some embodiments, a remote advisory unit adapted to provide the notification of the event to the controller, with the event duties including providing status updates of the event to the remote advisory unit. In other embodiments, identification of the event is based in part on sensor data from at least one vehicle in the vehicle set. The selected ones of the vehicle set may be assigned to respective locations at the event based on an order of arrival such that the selected ones arriving first are placed at the respective locations relatively closer to the at least one center.

In some embodiments, a portion of the vehicle set is owned by a fleet. A portion of the vehicle set may be owned by respective private owners. The controller may be adapted to send an alert to the respective private owners when the event is within a predefined geographical zone and transmit a request to the respective private owners to accompany the portion of the vehicle set based in part on a respective personal skill profile.

Disclosed herein is a method of managing a vehicle set with a controller having a processor and tangible, non-transitory memory on which instructions are recorded. The method includes incorporating in the vehicle set a plurality of autonomous vehicles each having a respective telematics unit adapted to communicate with the controller. The method includes receiving notification of an event, via the controller, and identifying at least one center of the event. The method includes determining a respective status of the vehicle set in real-time, including a respective availability and a respective proximity to the event, via the controller. The method includes dispatching selected ones of the vehicle set to the event based in part on the respective status, via the controller. The method includes assigning event duties to the selected ones of the vehicle set, via the controller. The event duties include forming a boundary around the at least one center of the event by being physically stationed around the at least one center.

The above features and advantages and other features and advantages of the present disclosure are readily apparent from the following detailed description of the best modes for carrying out the disclosure when taken in connection with the accompanying drawings.

Figure 1:
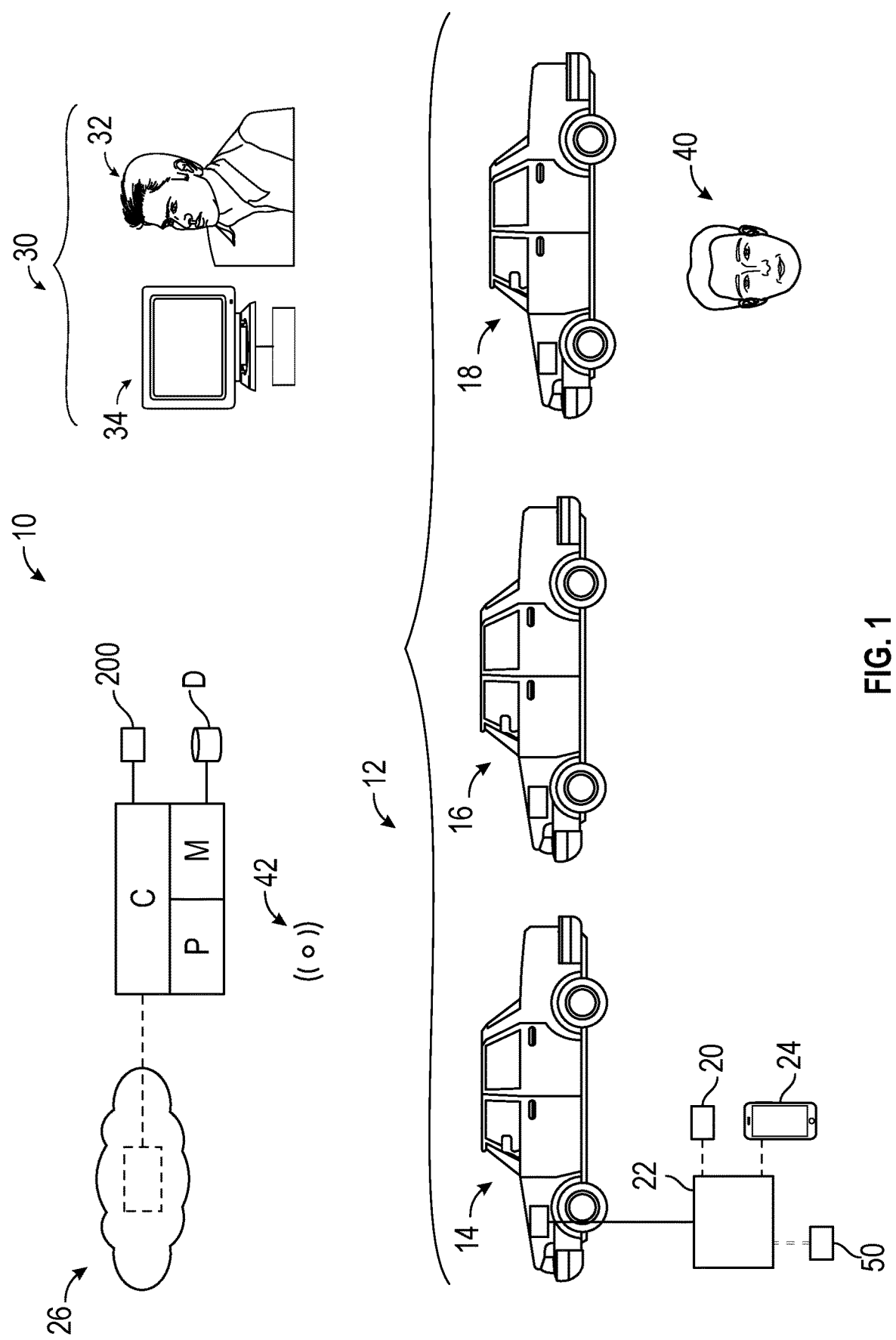
FIG. 1 is a schematic fragmentary diagram of a system for managing helper vehicles at an event.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Figure 2:
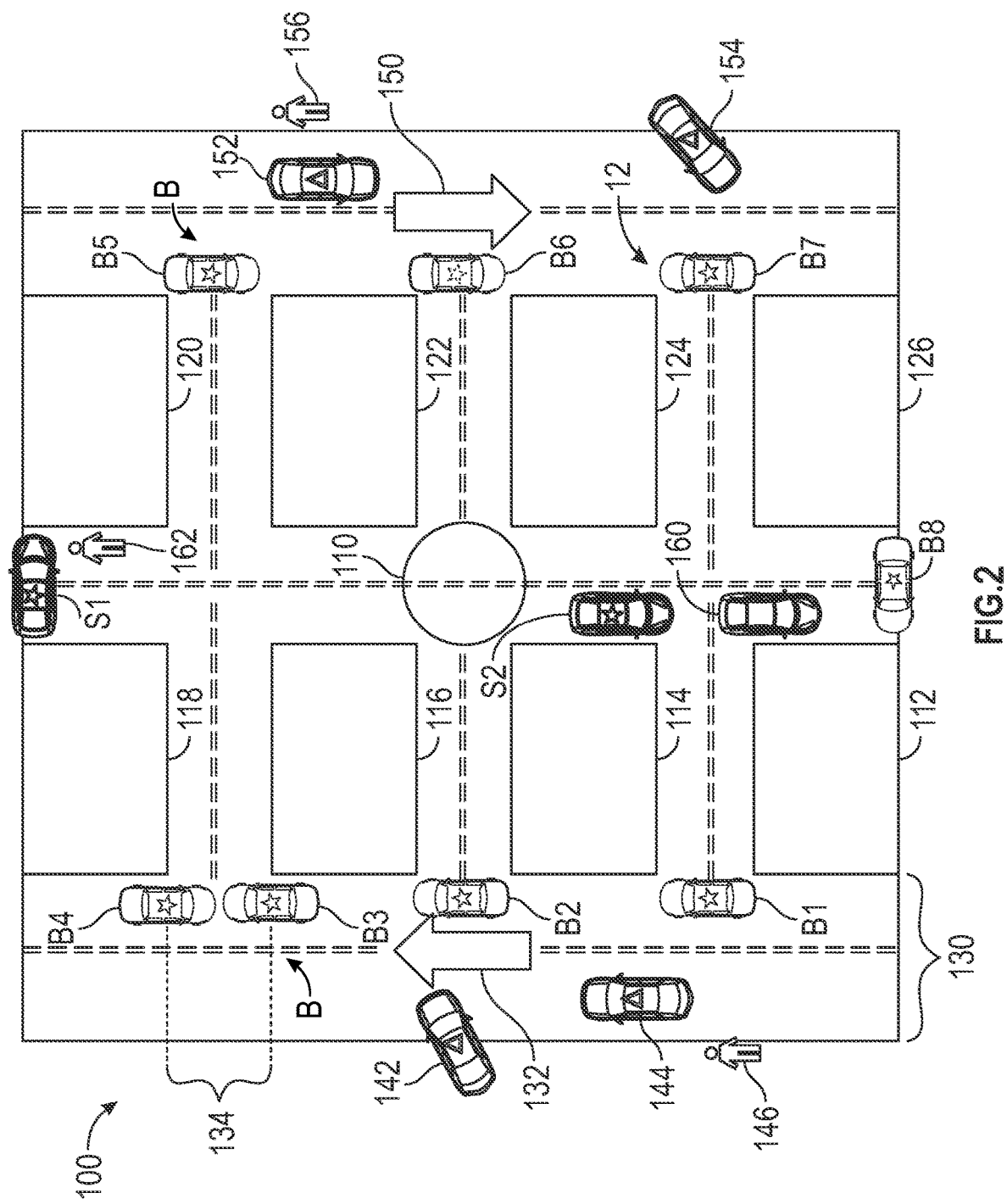
FIG. 2 is a schematic fragmentary diagram of an example event with the helper vehicles of FIG. 1.

Referring to the drawings, wherein like reference numbers refer to like components, FIGS. 1-2 schematically illustrate a system 10 for managing a vehicle set 12. The vehicle set 12 includes a plurality of autonomous vehicles, such as first vehicle 14, second vehicle 16, and third vehicle 18. The number of vehicles in the vehicle set 12 may be varied. The vehicle set 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train or another moving platform. The vehicle set 12 may include purely electric and partially electric vehicles. It is to be understood that the vehicle set 12 may take many different forms.

As described below, the system 10 provides a solution to dynamically and rapidly manage a vehicle set 12 that act as helpers to assist around an event. An example event 100 is shown in and described below with respect to FIG. 2. Referring to FIG. 1, the system 10 includes a controller C having at least one processor P and at least one memory M (or non-transitory, tangible computer readable storage medium) on which instructions may be recorded for executing a method 200 (shown in and described with respect to FIG. 3) of managing the vehicle set 12. The memory M may store controller-executable instruction sets, and the processor P may execute the controller-executable instruction sets stored in the memory M.

The system 10 (via execution of method 200) enables selected ones of the vehicle set 12 to be repurposed and routed to the event 100 where they are assigned various event duties. The system 10 allows for dynamic and automatic repurposing of the vehicle set 12 (those available) to respond to the scene of a concerning event that requires additional resources and actions. Information pertaining to availability of the respective vehicles in the vehicle set 12 may be stored in at least one database D that is updated in real-time and accessible to the controller C.

Referring to FIG. 1, the vehicle set 12 includes a plurality of autonomous vehicles each having a respective telematics unit 20 for establishing two-way communications with the controller C. The telematics unit 20 may collect telemetry data from the respective vehicle, such as location, speed, engine data, maintenance requirements and servicing, by interfacing with various internal sub-systems. The telematics unit 20 may enable vehicle-to-vehicle (V2V) communication and/or a vehicle-to-everything (V2X) communication. Each vehicle in the vehicle set 12 respectively includes a vehicle controller 22. The vehicles in the vehicle set 12 may respectively have access to a mobile application 24, which may be embedded in a smart device (e.g., smart phone) and plugged in or otherwise linked to the respective vehicle. The circuitry and components of a mobile application ("apps") available to those skilled in the art may be employed.

If the vehicle set 12 is part of a fleet, the controller C may be embedded in a master or leader vehicle. In another embodiment, the controller C may be hosted or based out of a remotely located cloud computing service 26, shown in FIG. 1. The cloud computing service 26 may include one or more remote servers hosted on the Internet to store, manage, and process data. The cloud computing service 26 may be at least partially managed by personnel at various locations.

The controller C is adapted to determine a respective status of the vehicle set 12 in real-time, including a respective availability and a respective proximity to the event 100. The controller C is adapted to dispatch selected ones of the vehicle set 12 to the event 100 based in part on their respective status and assign event duties to them. Referring to FIG. 2, the controller C is adapted to determine at least one center 110 of the event 100. The center 110 may be the core site of downed power lines, fallen trees, a vehicle issue, chemical spills, and other situations involving foul play. The vehicles arriving to support the event 100 may be prioritized and assigned locations to help control the area by starting in the immediate location of the center 110. As additional vehicles arrive, the vehicle set 12 may be reassigned to expand out to a desired radius based on city blocks, entry ramps, specific stretch of roadway, etc.

Figure 3:
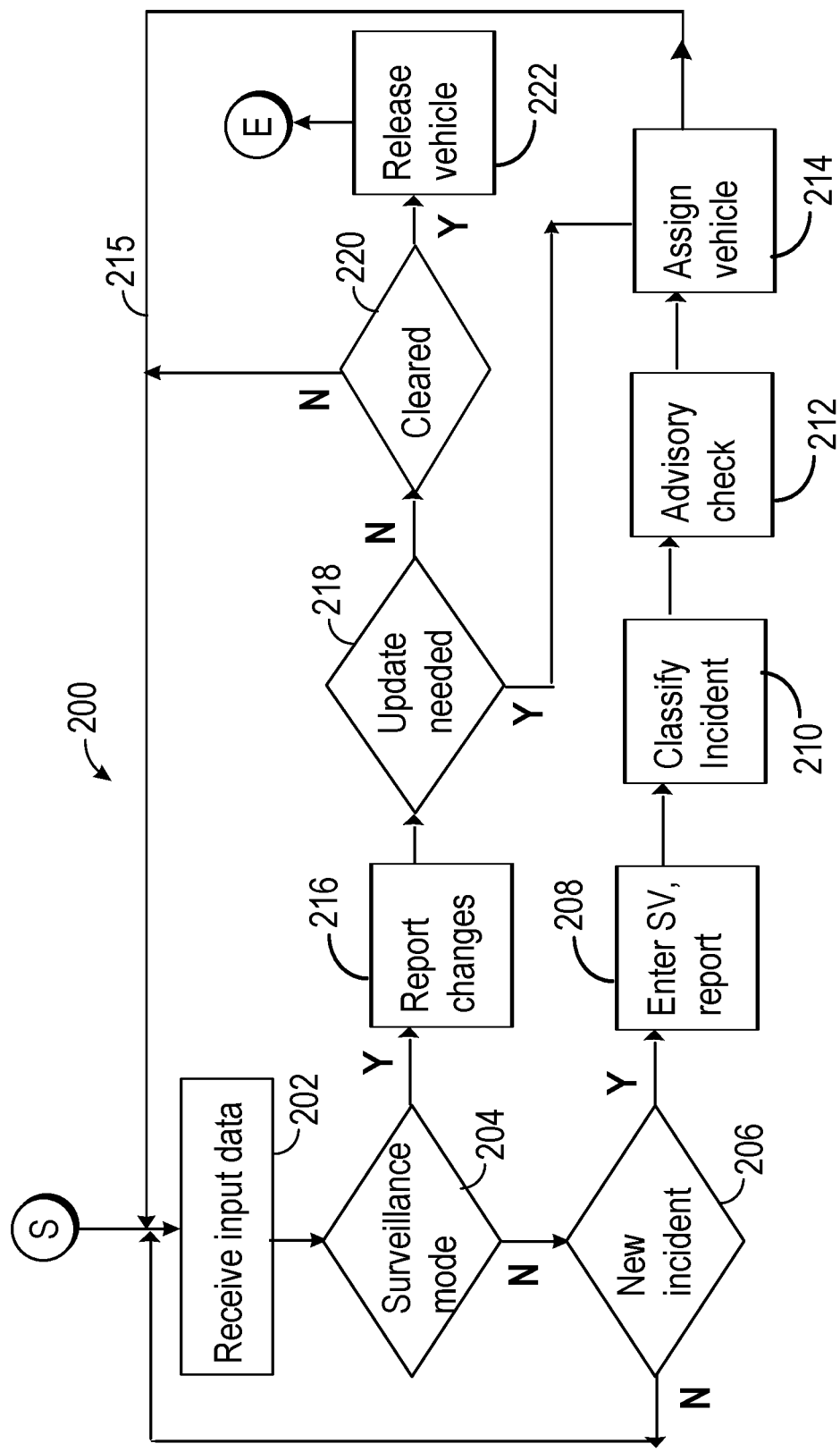
FIG. 3 is a flowchart for a method executable by the controller of FIG. 1.

Referring now to FIG. 3, a flowchart of an example method 200 of operating the system 10 is shown. Method 200 need not be applied in the specific order recited herein. Furthermore, it is to be understood that some blocks may be eliminated. In some embodiments, method 200 may be embodied as computer-readable code or stored instructions and may be at least partially executable by the controller C. The start and end of the method 200 are indicated by the letters "S" and "E."

Beginning at block 202 of FIG. 3, the method 200 includes receiving input data pertaining to the event 100. In some embodiments, the controller C is adapted to receive notification of the event 100 in real-time through a remote advisory unit 30. The remote advisory unit 30 may be manned electronically and/or by a remote advisor 32 having access to an electronic device 34 such as a desktop computer, laptop, tablet, cell phone or wearable device. The remote advisory unit 30 may include one or more servers that each include a processing device and a memory device.

In some embodiments, notification of the event 100 may originate from one vehicle on the vehicle set 12 which identify the need for support through sensors or situational awareness. In other words, the vehicle set 12 may be equipped with respective sensors, such as cameras and microphones, and report the need through V2X, short range wireless, or notification to the remote advisory unit 30.

The respective vehicles in the vehicle set 12 may be equipped with a surveillance mode 50 (executable by the vehicle controller 22) that allows them to detect new incidents and generate reports. Advancing to block 204, the controller C is adapted to determine if the surveillance mode 50 in at least one of the respective vehicles in the vehicle set 12 is enabled. If the surveillance mode 50 is not enabled (block 204-NO), method 200 proceeds to block 206 to determine if there is a new incident being reported by the remote advisory unit 30. If not (block 206=NO), the method 200 loops back to block 202. If there is a new incident (block 206=YES), the method 200 proceeds to block 208, where the surveillance mode 50 is enabled and a report may be generated for the remote advisory unit 30 based on the data provided by the surveillance mode 50.

Proceeding to block 210, the incident is classified by the controller C. For example, the incident may be classified as an electrical situation (e.g., downed power lines), fallen tree, vehicle issue, chemical spill, and/or situation involving foul play. Advancing to block 212 from block 210, the controller C is adapted to check the respective status of the vehicles in the vehicle set 12, including their availability, proximity to the event 100 and profiles (e.g., whether they are equipped with direction lights, loudspeakers, trailer for towing or other specific equipment). Referring to FIG. 1, information from the database D may be employed to determine availability and proximity of the vehicle set 12.

From block 212, the method 200 proceeds to block 214, where one or more vehicles from the vehicle set 12 are assigned to the event 100 based on their respective status. Also per block 212, the event duties are assigned, with specific roles at specific locations. The respective vehicles in the vehicle set 12 are instructed to coordinate intersections to isolate the city blocks, entry/exits to freeways, or a specific stretch of roadway. In the example shown in FIG. 2, the center 110 of the event 100 is in proximity to a plurality of streets, such as first street 130 extending parallel to a first direction 132, and a second street 134 orthogonal to the first direction 132. The orthogonal streets form a plurality of city blocks surrounding the center 110, such as blocks 112, 114, 116, 118, 120, 122, 124 and 126.

In the example shown in FIG. 2, the vehicle set 12 includes boundary vehicles B1, B2, B3, B4, B5, B6, B7 and B8 and surveillance vehicles S1, S2. Some vehicles in the vehicle set 12 may be assigned "perimeter" duty where they form a containment perimeter or boundary B around the center 110 of the event 100 by being physically stationed or parked around the center 110. The boundary B may be a loose boundary blocking incoming and outgoing street traffic around the center 110. An example boundary B formed by the boundary vehicles B1, B2, B3, B4, B5, B6, B7 and B8 from the vehicle set 12 is shown in FIG. 2.

The event duties may include advising surrounding entities to stay outside the boundary B. The surrounding entities include objects and persons in the vicinity of the boundary B, e.g., such as vehicle 152, passerby 146, and pedestrian 156 in FIG. 2. Some vehicles in the vehicle set 12 may be assigned "surveillance" duty where the selected vehicles (such as surveillance vehicles S1, S2 in FIG. 2) patrol an interior side of the boundary B and an exterior side of the boundary B to monitor the situation. The surveillance vehicles S1 and S2 (through execution of the surveillance mode 50) may generate a report if surrounding entities, such as intruding vehicle 160 and intruding pedestrian 162, cross into the interior side of the boundary B.

The event duties may include redirecting traffic around the center 110 of the event 100 using instruments such as direction lamps, displays, loudspeakers, flares etc. The event duties may include providing an audible signal of a detour route around the event 100. For example, referring to FIG. 2, boundary vehicles B1, B2, B3 may redirect passing vehicles 142, 144 along direction 132 through the use of loudspeakers. The boundary vehicles B5, B6, B7 may redirect passing vehicles 152, 154 along with pedestrian 156 along direction 150 through the use of direction lamps and/or flares.

The vehicles that are selected from the vehicle set 12 may be assigned to respective locations at the event 100 based on an order of arrival such that the selected ones arriving first are placed at the respective locations relatively closer to the center 110. The controller C may be adapted to implement modules that prioritize, assign, and move vehicles to optimize coverage and visibility into situations.

From block 214 of FIG. 3, the method 200 loops back to block 202, as indicated by line 215. Per block 204, if the surveillance mode 50 is enabled (block 204=YES), the method 200 proceeds to block 216, where the controller C is adapted to report changes in data monitoring and receive updates on the event 100. Proceeding to block 218, the controller C is adapted to determine if an update in the instructions to the vehicle set 12 is needed, e.g., changes in the event duties, changes in the location of the boundary B, or activation of the surveillance mode 50 for some of the vehicles.

If an update in the instructions to the vehicle set 12 is needed (block 218=YES), the method 200 proceeds to block 214. If an update is not needed (block 218=NO), the method 200 proceeds to block 220, where the controller C is adapted to determine if the incident has been cleared, i.e., vehicle support is no longer needed. This assessment may be made by the remote advisory unit 30, based on information provided by relevant authorities.

If the incident has not been cleared (block 220=NO), the method 200 loops back to block 202, as indicated by line 215. If the incident has been cleared (block 220=YES) and vehicle support is no longer needed, the method 200 proceeds to block 222 to release the respective vehicles in the vehicle set 12 from the event 100 and the method 200 ends.

In some embodiments, a portion of the vehicle set 12 is owned by a fleet. The system 10 allows a fleet owner to make their vehicles available from dealer lots, autonomous ride shares, or manufacturing plants which provides large scale support and alleviates privacy concerns of repurposing personal vehicles. The fleet owner may flag vehicles for availability, check their status to focus on empty or idle units, and direct them to respond. These actions may be triggered by awareness of the event 100 through the remote advisory unit 30 and/or through alliances with authorities.

In some embodiments, a portion of the vehicle set is owned by respective private owners who opt in to offer their vehicles as helpers during periods of availability. The controller C may be adapted to send an alert to a private owner 40 when the event 100 is within a predefined geographical zone.

Furthermore, the system 10 may allow a private owner 40 to opt in to accompany their vehicle based on their respective personal skill profile. For instance, the private owner 40 may be a health care worker such as a doctor, nurse, or paramedic who provided a profile to the database D that includes their availability and skills. The controller C may transmit a request to the respective private owners to accompany their respective vehicles when their skills, such as delivering medical care, are appropriate for the event 100. For example, a private owner 40 may have their profile set to alert them when the event 100 is within 10 miles of their location in real-time. The private owner 40 may choose to let their vehicle be rerouted, either autonomously or through navigation apps, to respond, and may accompany the vehicle to the event 100 if that criteria is met.

Referring to FIG. 1, a wireless network 42 may be employed to facilitate communications amongst various components of the system 10. The wireless network 42 may be a short-range network or a long-range network. The wireless network 42 may be a communication BUS, which may be in the form of a serial Controller Area Network (CAN-BUS). The wireless network 42 may be a serial communication bus in the form of a local area network. The local area network may include, but is not limited to, a Controller Area Network (CAN), a Controller Area Network with Flexible Data Rate (CAN-FD), Ethernet, Bluetooth, WIFI and other forms of data. The wireless network 42 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

In summary, the system 10 allows for dynamic and automatic repurposing of a vehicle set 12 to respond to the scene of a concerning event 100 that requires more resources and actions, such as to secure the area, divert traffic flow, and provide status to other vehicles, passersby, and responsible entities. The system 10 (via execution of method 200) enables selected ones of the vehicle set 12 to be repurposed and routed to the event 100 where they are assigned various event duties. The event duties including creating a boundary B (see FIG. 2) around the event 100 through being physically parked around the center 110 of the event 100. The vehicles in the vehicle set 12 may also be tasked with detecting the initial incident, requesting help from others in the area, determining the type of help needed, and monitoring the situation to determine if it is resolved, escalated, or requires more support. Additionally, the system 10 enables respective private owners of vehicles to opt in to offer their vehicles for support as well as their own personal skills.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire, and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer may read.

Look-up tables, databases, data repositories or other data stores described herein may include various kinds of mechanisms for storing, accessing, and retrieving various kinds of data, including a hierarchical database, a group of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based storage systems that perform the specified functions or acts, or combinations of specific purpose hardware and computer instructions. These computer program instructions may also be stored in a computer-readable medium that may direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description, are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for managing a vehicle set, the system comprising:
   a controller having a processor and tangible, non-transitory memory on which instructions are recorded;
   wherein the vehicle set includes a plurality of autonomous vehicles each having a respective telematics unit adapted to communicate with the controller, a portion of the vehicle set being owned by respective private owners;
   wherein the controller is adapted to:
      receive notification of an event and identify at least one center of the event;
      determine a respective status of the vehicle set in real-time, including a respective availability and a respective proximity to the event;
      dispatch selected ones of the vehicle set to the event based in part on the respective status; and
      assign event duties to the selected ones of the vehicle set, the event duties including forming a boundary around the at least one center of the event by being physically stationed around the at least one center;
      send an alert to the respective private owners when the event is within a predefined geographical zone;
      determine one or more skills appropriate for the event and retrieve a respective personal skill profile of the respective private owners from a database; and
      transmit a request to the respective private owners to accompany the portion of the vehicle set when the respective personal skill profile meets the one or more skills for the event.

2. The system of claim 1, wherein the event duties include advising surrounding entities to stay outside the boundary, the surrounding entities including vehicles and/or pedestrians.

3. The system of claim 1, wherein the event duties include:
   monitoring an interior side of the boundary and an exterior side of the boundary; and
   reporting if surrounding entities cross into the interior side of the boundary, the surrounding entities including vehicles and/or pedestrians.

4. The system of claim 1, wherein the event duties include redirecting traffic around the at least one center of the event.

5. The system of claim 1, wherein the event duties include providing an audible signal of a detour route around the at least one center of the event.

6. The system of claim 1, wherein the selected ones of the vehicle set are assigned to respective locations at the event based on an order of arrival such that the selected ones arriving first are placed at the respective locations relatively closer to the at least one center.

7. The system of claim 1, further comprising:
a remote advisory unit adapted to provide the notification of the event to the controller; and
wherein the event duties include providing status updates of the event to the remote advisory unit.

8. The system of claim 1, wherein identification of the event is based in part on sensor data from at least one vehicle in the vehicle set.

9. The system of claim 1, wherein a portion of the vehicle set is owned by a fleet.

10. A method of managing a vehicle set with a controller having a processor and tangible, non-transitory memory on which instructions are recorded, the method comprising:
incorporating in the vehicle set a plurality of autonomous vehicles each having a respective telematics unit adapted to communicate with the controller, wherein a portion of the vehicle set is owned by respective private owners;
receiving notification of an event, via the controller, and identifying at least one center of the event;
determining a respective status of the vehicle set in real-time, including a respective availability and a respective proximity to the event, via the controller;
sending an alert to the respective private owners when the event is within a predefined geographical zone, via the controller;
determining one or more skills appropriate for the event and retrieving a respective personal skill profile of the respective private owners from a database, via the controller;
transmitting a request to the respective private owners to accompany the portion of the vehicle set when the respective personal skill profile meets the one or more skills for the event, via the controller;
dispatching selected ones of the vehicle set to the event based in part on the respective status, via the controller; and
assigning event duties to the selected ones of the vehicle set, via the controller, the event duties including forming a boundary around the at least one center of the event by being physically stationed around the at least one center.

11. The method of claim 10, further comprising, incorporating in the event duties:
advising surrounding entities to stay outside the boundary, the surrounding entities including vehicles and/or passersby.

12. The method of claim 11, further comprising, incorporating in the event duties:
monitoring an interior side of the boundary and an exterior side of the boundary; and
reporting if the surrounding entities cross into the interior side of the boundary.

13. The method of claim 10, further comprising, incorporating in the event duties:
redirecting traffic around the at least one center of the event.

14. The method of claim 10, further comprising, incorporating in the event duties:
providing an audible signal of a detour route around the at least one center of the event.

15. The method of claim 10, further comprising:
assigning the selected ones of the vehicle set to respective locations at the event based on an order of arrival such that the selected ones arriving first are placed at the respective locations relatively closer to the at least one center.

* * * * *